Jan. 4, 1966
D. E. DYKAAR
3,227,951
ELECTRICAL DEVICE FOR CAPACITIVELY MEASURING THE
THICKNESS OF A LAYER OF FLUID
Filed Feb. 17, 1961
2 Sheets-Sheet 1
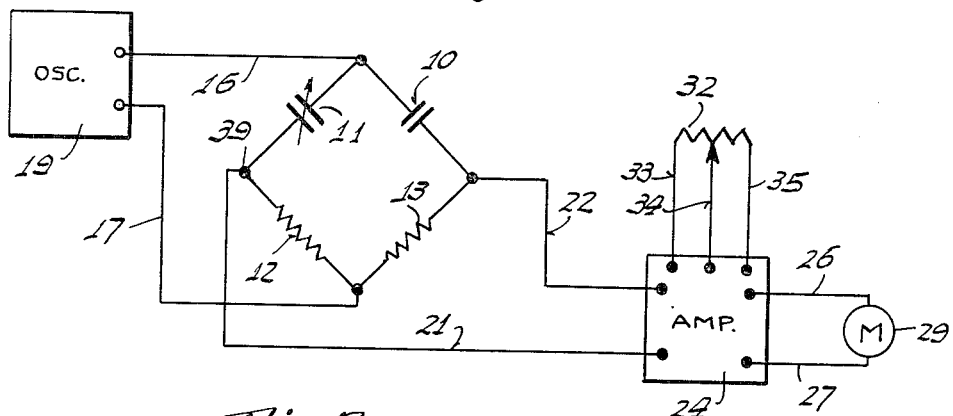
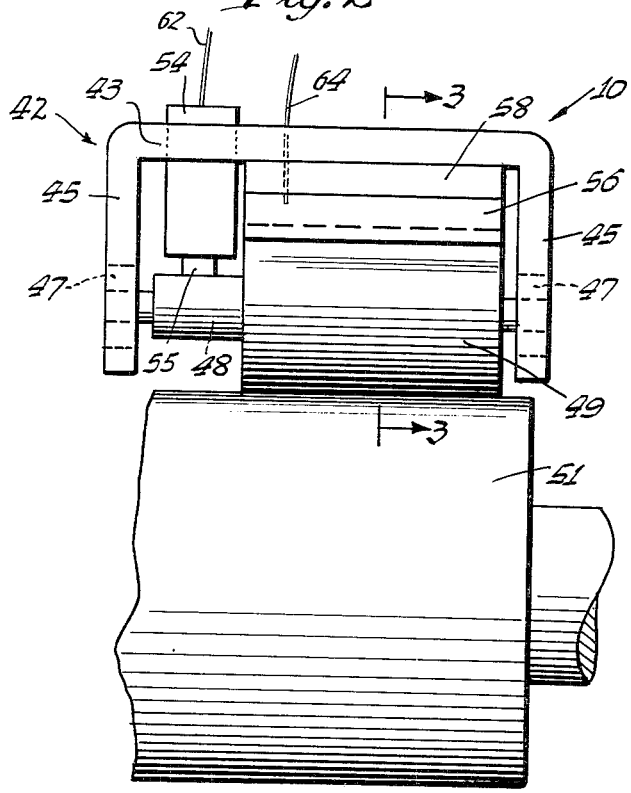
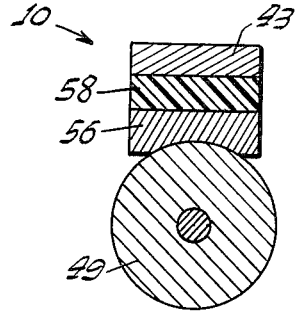
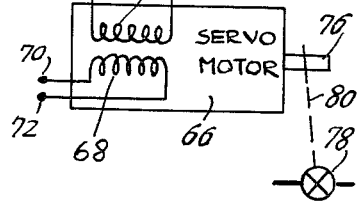
INVENTOR.
David E. Dykaar Jan. 4, 1966        D. E. DYKAAR        3,227,951
ELECTRICAL DEVICE FOR CAPACITIVELY MEASURING THE
        THICKNESS OF A LAYER OF FLUID
Filed Feb. 17, 1961                2 Sheets-Sheet 2

INVENTOR.
David E. Dykaar

United States Patent Office 3,227,951
Patented Jan. 4, 1966

3,227,951
ELECTRICAL DEVICE FOR CAPACITIVELY MEASURING THE THICKNESS OF A LAYER OF FLUID
David E. Dykaar, 212—23 16th Ave., Bayside, N.Y.
Filed Feb. 17, 1961, Ser. No. 90,075
2 Claims. (Cl. 324—61)

This invention relates to the art of non-destructive measuring, and more particularly to the measurement of thin films of liquid substance which has dielectric properties.

The invention is shown as applied to the ink-carrying rollers of a printing press. However, it should be understood that the invention is not limited to such use, since it has utility generally in the field of non-destructive measuring wherever thin liquid films are being utilized, and where it is required that the thickness of a film be known and closely held.

It has heretofore been proposed to measure, by electrical capacitance methods the thickness of moving webs of solid or non-liquid material, which webs are passing over or around a metal roller. A prior device of this type is illustrated and described in the patent to Lippke, No. 2,870,403, issued January 20, 1959. It has also been proposed to measure the thickness of liquid material which is taken up by and which coats a web passing through the liquid substance for treatment. A method and means for measuring the thickness of such liquid substance carried by a web is illustrated and described in Patent No. 1,895,118 issued to Allen and dated January 24, 1933. The present invention differs from the above patents, and embraces the measurement of thickness of a liquid film which is being carried by and is coated on a rotating roller, such measurement being not contemplated or suggested in the above-identified prior art.

Accordingly an object of the invention is to provide a novel and improved method and apparatus for measuring the thickness of films of liquid having dielectric properties, by utilizing the electrical capacitance effect, when such films are carried by rotating rollers.

An additional object of the invention is to provide a novel and improved method and apparatus for measuring liquid films carried on rotating rollers, which may be readily applied to and utilized with existing equipment without requiring any appreciable alteration thereof.

Another object of the invention is to provide a novel and improved apparatus and method in accordance with the foregoing, which is extremely simple and inexpensive to apply and to utilize.

A further object of the invention is to provide an apparatus and method as above set forth, which is characterized by a high degree of accuracy and reliability.

A feature of the invention resides in the provision of an apparatus for measuring the thickness of liquid films and the like, wherein there is a measurement translating means constituted as a separate unit, which is separately constructed and calibrated and which may be readily applied to existing equipment.

Still another object of the invention is to provide an improved liquid film measuring apparatus as above set forth, which is easily cleaned and serviced.

Other features and advantages will hereinafter appear.

In the drawings accompanying this specification similar characters of reference are used to designate like components throughout the several views, in which:

FIGURE 1 is a schematic diagram of the present improved measuring apparatus.

FIGURE 2 is a fragmentary elevational view of the transducer unit of the measuring apparatus, as applied to the printing roller of a printing press.

FIGURE 3 is a sectional view of the transducer, taken on the line 3—3 of FIGURE 2.

FIGURE 6 is a fragmentary diagrammatic representation illustrating a servomotor and hydraulic valve actuated by the motor, these units constituting a control adapted to be used with the apparatus shown in FIGURE 1, to effect automatic feeding of the liquid in a piece of equipment such as a printing press.

Figure 4:
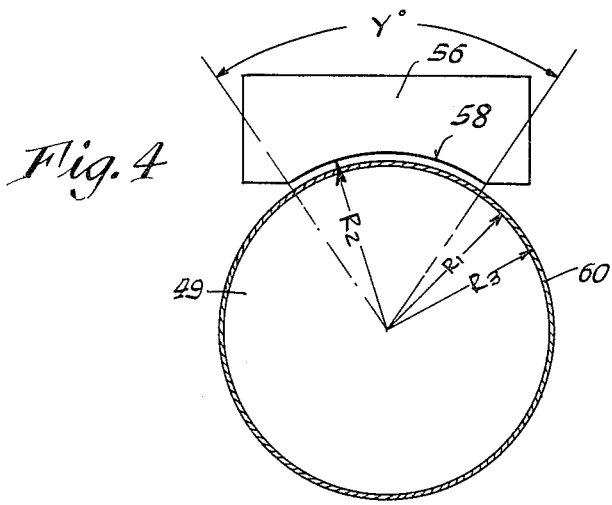
FIGURE 4 is a diagrammatic representation of the two conductor parts or elements of the transducer unit, illustrating the relative shapes and positions thereof.

The improved apparatus of the present invention in its entirety is diagrammatically illustrated in FIG. 1. The apparatus comprises a novel, capacitive-type transducer unit connected in a capacitance measuring circuit, such transducer unit being shown schematically and indicated by the numeral 10 in the figure. Details of the transducer unit 10 are given below. Broadly, this unit may utilize a liquid film on a rotating roller as the dielectric of a condenser structure in such a manner that variations in the thickness of the film will result in variations of capacitance of the transducer. Such variations of capacitance are utilized, in the circuit shown, to provide the desired indications or readings.

Referring specifically to FIG. 1, the transducer 10 is connected in an impedance bridge circuit, such circuit comprising a capacitor 11 which may be a variable capacitor as shown. The impedance bridge circuit also has two legs 12 and 13 comprising resistor units. As shown, the components 10, 11, 12 and 13 are series connected to each other in the manner of a bridge, and wires 16 and 17 lead respectively from the common junction of the capacitors 10, 11 and common junction of the resistors 12, 13, such wires being connected to an electrical oscillator or generator 19 of a type adapted to provide a high frequency signal. The remaining two opposite corners of the impedance bridge are connected by wires 21 and 22 to the input of an amplifier 24, such amplifier including preferably in its output circuit a rectifier device (not shown) to provide a D.C. output. The output of the amplifier 24 is connected by wires 26 and 27 to an indicating meter 29 which may be of the D.C. milliammeter type.

The degree of amplification of the amplifier 25 is controlled by a potentiometer unit 32 connected by wires 33, 34 and 35 to an appropriate portion of the amplifier circuit, as is well understood in the electronics field.

In accordance with the present invention the transducer 10 is so arranged that it comprises an electrical condenser, part of the dielectric of which is constituted of a thin film of liquid, such as for example a film of printing ink carried by the rotating rollers of a printing press. The transducer 10 may utilize the actual film on the roller of the printing press or other piece of equipment, or it may further, in accordance with the invention, utilize a portion of such film which is transferred to another member, preferably a rotating member, such other member, comprising in the illustrated embodiment an element of the transducer condenser structure.

Considering the circuit of FIG. 1, zero adjustment of the meter 29 may be obtained by balancing the bridge with the transducer 10 devoid of any film of liquid. That is, the transducer 10 would have a minimum capacitance value. The balance of the bridge is effected by adjusting the variable capacitor unit 11 until the meter 29 reads zero. This indicates that the potential difference between the opposite points 39 and 40 of the bridge is zero. In other words, the voltage drops across the capacitor 11 and the transducer 10 are equal. As will be shortly brought out, the introduction of a dielectric film in the transducer 10 will increase the capacitance of the same, thereby unbalancing the bridge, and the amount of unbalance may be read on the meter 29, which will now be deflected to a greater extent as the unbalance increases, and vice versa.

As mentioned above, the transducer 10 is in the form of an electrical condenser which utilizes as part of the dielectric the film of liquid whose thickness is to be measured, or else an associated film which has a definite relationship to the film whose thickness is to be measured. Considering the details of the transducer 10, referring to FIGS. 2, 3 and 4, such transducer may comprise a U-shaped frame 42 have a yoke portion 43 and depending legs 45. The legs 45 are provided with suitable bearings 47 rotatably carrying a measuring roller 49, said roller being adapted to be brought into engagement with and to be driven by a printing roller 51 of a printing press, or else any other suitable roller on which there is a thin film of liquid substance having dielectric properties the thickness of which film is to be measured. Electrical connection maly be established to the measuring roller 49, which may be either of metal or else have a metallic or electrically conducting peripheral surface, by means of a brush assemblage comprising a holder 54 and brush 55, the latter engaging a hub or slip ring 48 on the same shaft as the roller 49 and arranged to turn therewith.

The transducer 10 further comprises a fixed or stationary conductive element 56 which is insulatedly mounted on the frame 42, as by the use of an insulating block 58. The conductive element 56, as clearly shown in FIG. 4, has a curved surface 58 which is electrically conducting, and which is of cylindrical nature, being concentric with the roller 49 and spaced from the periphery of the roller an extent slightly greater than the thickness of the film of liquid 60 which is to be carried by the periphery of the roller. Suitable electrical leads 62 and 64 are carried out from the brush assemblage and from the conductive element 56, as indicated in FIG. 2. It will be understood that the roller 49 and the member 56, being spaced apart and being insulated from each other, may comprise an electrical condenser unit and that the thin film of liquid 60 on the roller 49 may constitute part of the dielectric of such condenser, the remainder of the dielectric being air as shown in FIG. 4. Considering this figure, it will be understood that when the dielectric between the elements 49 and 56 is altered it will result in alteration of the capacitance represented by such elements. In other words, as the thickness of the film of liquid 60 changes, becoming either greater or less, the capacitance of the transducer will become either greater or less in a corresponding manner. As the capacitance of the transducer unit 10 increases the voltage drop across the same will decrease, and this will result in an increase in the potential difference between the points 39 and 40 of the impedance bridge. This will effect a deflection of the needle of the meter 29, as will be understood.

I have found that when the transducer unit 10 (or more properly the roller 49 thereof) is engaged with a roller carrying a liquid film, such as the roller 51 illustrated in FIG. 2, a portion of the liquid film on the roller 51 will be transferred to the measuring roller 49, this portion moving with the roller and being brought between the condenser elements 49 and 56. The said portion, after thus travelling and changing the effective value of the dielectric between the elements, will be again brought into engagement with the supplying roller 51 and will be returned at least in part to the said supplying roller. I have found that the thickness of the film of liquid which is carried by the measuring roller 49 has a definite relation to the thickness of the film of liquid on the roller 51, and accordingly is a function of the latter. Therefore, if a measurement is had of the thickness of the film on the measuring roller 49 this will provide an accurate indication of the thickness of the liquid film on the roller 51.

The apparatus of the present invention has utility and advantage in connection with equipment such as printing presses and the like, and the apparatus will accurately indicate the thickness of printing ink on a printing roller such as the roller 51 shown in FIG. 2. However, as already stated above, the invention is not limited to use in connection with printing equipment since it has utility wherever a thin film of liquid having dielectric properties is being carried by a turning roller, and where it is desired to know and to control the thickness of such film.

In the event that the maximum expected thickness of ink or liquid on the roller 51 is to provide a full scale reading of the meter 29, this is effected by adjusting the potentiometer gain control 32 provided for the amplifier 24. Such setting will then correspond to the highest expected potential difference between the points 39 and 40 on the impedance bridge. Needle deflections between zero and full scale will not necessarily be linear with ink film thicknesses, but the choice of a proper meter scale will allow a direct reading to be had of film thickness in inches, or any other desired units.

The circuit of FIG. 1 may be utilized in conjunction with a servo-type control, as illustrated in FIG. 6. In this figure a servo-motor 66 is shown, having a control winding 68 provided with terminals 70 and 72 which may be connected to the output of a phase sensitive capacitance bridge and amplifier circuit, the bridge portion of which would be substantially as shown in FIG. 1. The servo-motor 66 has an exciting winding 74 of the usual type, and the shaft 76 of the servo-motor is shown as being mechanically coupled to a hydraulic valve 78, this being indicated by the broken line 80. With such organization, forward or reverse rotation of the servo-motor 66 will effect an opening or closing of the valve 78, thereby to automatically control the supply of ink to the printing roller under the influence of the transducer 10.

It will be understood that the broken line 80 may represent a gear transmission or equivalent type mechanical connection between the servo-motor 66 and the valve 78. In the servo-mechanism circuit the change in the capacitance of the transducer 10 will be electrically compared to a standard capacitance such as the capacitor 11, and such standard may be made variable or adjustable if desired. The difference signal would be utilized to effect an eventual automatic control of the feeding of ink to the printing roller 51, or would control the feed of any other dielectric liquid material, as will be understood.

Figure 5:
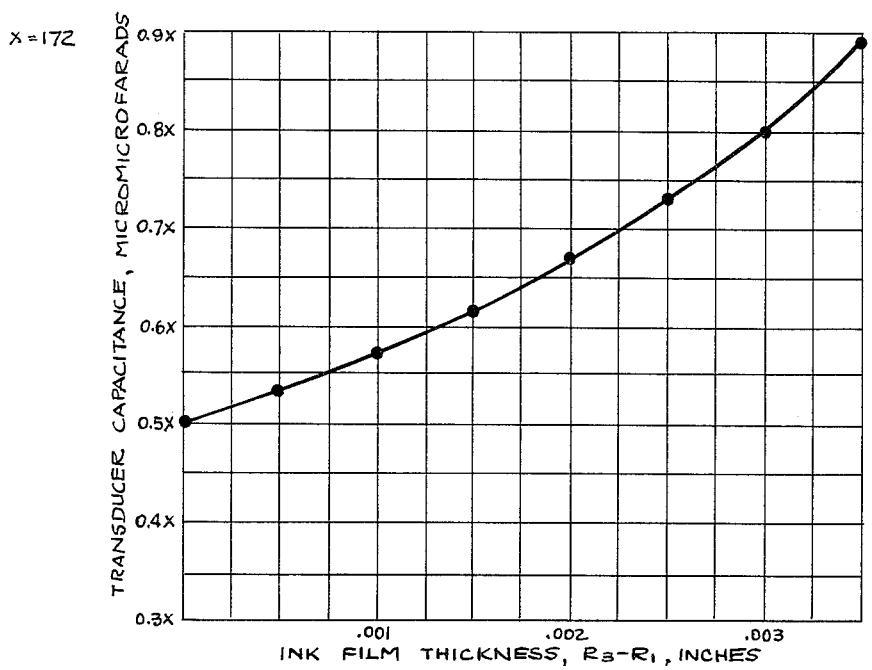
FIGURE 5 is a chart or graph illustrating the relationship between the capacitance values of the transducer and the film thickness of the liquid carried by the roller element of the transducer unit.

In FIG. 5 there is given a chart, indicating the relationship between the capacitance of a specific transducer structure and the thickness of the ink film on the roller 51. The factor X is a constant having a value og 172. For the graph of FIG. 5, the following values were used. Length of measuring roller 49, 2.00 inches. Central angle subtended by the curved surface 58, 70 degrees. Radius of roller 49, 1.250 inches. Radius of curvature of curved surfaces 58, 1.254 inches. Dielectric constant of the ink utilized, 2.00. It is assumed that with such transducer structure the radius of the outer surface of the film of ink will never exceed 1.253 inches, thus leaving at least .001" clearance between the ink film and the stationary element 56. To measure films of greater thickness, the radius of curvature of the surface 58 would be increased. The percentage accuracy of the measurement would remain the same, however. That is, if for a given radius of the surface 58 and a given radius of the roller 49 the accuracy of measurement is expressed as some percentage X of the large radius minus the smaller, then this accuracy figure will remain constant, and for different values of these two radii the accuracy of the ink film measurement will be X times the difference between the two radii, in inches. It can be shown that the capacitance of the transducer described herein may be given by the formula:

$$\frac{1}{C} = \frac{9 \times 10^5}{.2171L}\left[\frac{\log_{10}\frac{R_3}{R_1}}{K_2} + \frac{\log_{10}\frac{R_2}{R_3}}{K_1}\right]\frac{Y°}{360°}$$

Where:

$C$=Capacitance in microfarads $R_1$, $R_2$, and $R_3$ are as shown in drawing number 2.

$K_2$=Dielectric constant of the material on shaft "A" whose thickness is to be measured.

$K_1$=1.00, dielectric constant for air.

$Y°$=The number of degrees the curved part "B" envelopes the shaft "A."

$L$=Axial length of part "B" (assuming shaft "A" is at least length L at Radius $R_1$).

It will now be understood from the foregoing that I have provided a novel and improved method and apparatus for measuring the thickness of a film of liquid which is being carried on the surface of a turning part in a piece of equipment, as for example the inking roller of a printing press.

The method of the invention embraces utilizing such surface as one conductor or element of a capacitor, and utilizing the film of liquid as part of the dielectric of the capacitor. Where the transducer 10 is utilized, the method of the invention includes the step of removing a portion of the film from the roller 51, simultaneously applying this portion evenly over the surface of the roller 49 to alter the effective dielectric value and capacitance of the transducer 10, and indicating the altered capacitance value of the transducer. The method also involves continually returning the transferred or applied portion of the film to the primary roller 51, as the two rollers simultaneously rotate in engagement with each other.

It will be seen that the method and apparatus are extremely simple, and that the apparatus may be readily applied to existing equipment with little alteration thereof. The transducer 10 may be readily cleaned and easily serviced, and the electronic equipment associated with the transducer 10 may comprise any of various types of capacity meters, impedance bridge circuits, etc.

Variations and modifications may be made within the scope of the claims, and portions of the improvements may be used without others.

I claim:

1. A device for measuring the thickness of a first film of liquid which has a dielectric constant different from air which is disposed on a first roller and which has dielectric properties, comprising a capacitive transducer having a pair of insulated conductors having a relatively fixed spacing therebetween, one of said conductors comprising a second roller having a peripheral surface disposed opposite the other conductor, said second roller engaging said first film to be driven by said first roller and to have deposited thereon a second film of said liquid from said first roller, the thickness of said second film being proportional to the thickness of said first film; and a capacitance meter connected to said connectors and responsive to changes in the capacitance of the transducer as effected by changes in the thickness of the deposited liquid film on the said roller-conductor, thereby to provide indications of the thickness of said second film, and, thereby the thickness of said first film.

2. The invention as defined in claim 1 in which the said other conductor has a curved surface extending around and substantially concentrically spaced from the periphery of the roller-conductor and constituting an active capacitive element.

References Cited by the Examiner
UNITED STATES PATENTS

| | | | |
|---|---|---|---|
| 1,878,109 | 9/1932 | Clark | 324—61 |
| 1,886,508 | 11/1932 | Wierk | 324—61 X |
| 2,146,442 | 2/1939 | Price | 324—61 X |
| 2,806,204 | 9/1957 | Rothacker | 317—246 |
| 2,849,675 | 8/1958 | Hall et al. | 324—61 |

WALTER L. CARLSON, *Primary Examiner.*